United States Patent Office

3,388,201
Patented June 11, 1968

3,388,201
POLYVINYL CHLORIDE TEXTILE FIBRES AND
METHOD OF MANUFACTURING
Corrado Mazzolini and Francesco Denti, Mestre, Venezia, Italy, assignors to Chatillon Società Anonima Italiana per le Fibre Tessili Artificiali S.p.A., Milan, Italy
Filed Apr. 1, 1963, Ser. No. 269,257
Claims priority, application Italy, Apr. 6, 1962, 6,928/62; Sept. 27, 1962, 19,069/62, 19,070/62; Nov. 14, 1962, 22,098/62, 22,399/62
10 Claims. (Cl. 264—184)

This invention pertains to the art of processing vinyl chloride polymers to obtain commercially valuable fibres, suitable for the textile industry and many other uses requiring filaments or threads exhibiting a satisfactorily high tenacity, elongation at break contained within reasonable limits, an excellent heat-shrinkage resistance, low fragility, an elevated flex-abrasion resistance, substantial insensitivity to boiling water and solvents such as used in dry-cleaning textile fabrics, good dyeability, resistance to flame-propagation, etc.

Fibres obtained from conventional PVC (i.e. PVC obtained by suspension- or emulsion-polymerization in the presence of peroxidic or redox-type catalysts, at temperatures ranging from 15° to 80° C.) are far from meeting the above requirements.

With the above in view, new and valuable polymers of vinyl chloride have been developed by a relatively recent technique, abundantly described in the relevant literature and based on a polymerization at temperatures lower than —10° C., down to —60° C. and even deeper, in the presence of suitable catalysts effective at such low temperatures.

These new vinyl chloride polymers have been said to be predominantly syndiotactic in structure (e.g. J. Polymer Science 39, 1959, pp. 321–325); such polymers have also been said to have a very low degree of lateral branching as compared with conventional PVC (e.g. Chem. & Ind. 1958, p. 1114). One of the distinguishing factors of the new polymers is the ratio of their infrared absorption bands D635 and D693 (see J.A.C.S. 82, 1960, p. 749). The determination of said ratio is performed by means of a double-beam spectrophotometer, such as Perkin-Elmer Mod. 21, with potassium bromide optics. The sample consists of a polymer film of 20–30 micron thickness, suitable for infrared analysis. The sample is obtained by dissolving the polymer in cyclohexanone while maintaining the latter at about 120° C. for about 15 minutes to obtain a solution at a concentration of 0.8–1% B.W. polymer, rapidly cooling the solution to about 50° C., pouring the cool solution on a planar sheet of glass and drying at about 50° C. under vacuum (10 mm. Hg-column). Conventional PVC exhibits a D635 to D693 absorption ratio of about 1.4–1.6; whereas the new polymers exhibit a D635 to D693 absorption ratio of at least 1.8 (and even 3.0). Whatever may be the true significance of this measurable infrared band absorption ratio, the latter will be called hereinafter "degree of syndiotacticity" (DS) according to the more widely accepted interpretation. Consequently, PVC-polymers showing a DS-value of at least 1.8 will be called hereinafter "high-DS."

Several methods and catalysts for obtaining the above-mentioned high-DS PVC are described in the literature.

The 2nd order transition temperature ($T_g$) of a high-DS PVC generally exceeds 90°–100° C.; $T_g$ values of about 110° C. and even higher are not unfrequent. Whereas the $T_g$ value of a conventional PVC is about 78° C. (J. of Polymer Science, vol. 56, 1962, pp. 225–231). Still more interesting is the circumstance that, while conventional PVC is readily permanently deformed at temperatures exceeding its $T_g$-value already under extremely low loads, the high-DS PVC maintains a considerable mechanical resistance at temperatures exceeding its $T_g$-value. Moreover, the high-DS PVC dissolves in some only of the solvents of conventional PVC; so, for example, it is dissolved by cyclohexanone, dimethylformamide and dimethylacetamide at temperatures not lower than about 100° C., and is not dissolved by acetone-carbon disulfide mixtures, tetrahydrofurane, dioxane, even by operating at the boiling temperatures of the latter solvents.

Several proposals are known for processing the high-DS PVC by dissolving the latter in a suitable solvent, dry- or wet-spinning the resulting dope to obtain raw filaments, then stretching the heat-stabilizing the filaments with a view of obtaining a possibly valuable commercial product capable of fulfilling certain at least of the requirements listed hereinbefore. Experience has shown that processing high-DS PVC to obtain satisfactory textile fibres is an unexpectedly hard problem.

This invention provides an extraordinarily efficient, commercially valuable method of processing high-DS PVC to fibres along the general lines of dissolving said PVC in a solvent thereby to provide a spinning dope, then spinning the dope to obtain filaments, and stretching and heat-treating said filaments. The method involves both certain new specific stages and specific stage-conditions, as well as a concatenation (mutual dependence) of said stages and conditions. A first result of such specific stages, conditions and their mutual dependence is that cyclohexanone only (as distinct from dimethylformamide, dimethylacetamide and other possible solvents for high-DS PVC) is suitable as a solvent for forming the spinning dope. Thus, the instant method is essentially characterized in that:

(a) The spinning dope is formed by dissolving in cyclohexanone at a temperature between 110° C. and about 156° C. a high-DS vinyl chloride polymer of a mean molecular weight between 50,000 and 120,000 in an amount providing a gel-free dope containing between 15% and 20% by weight of said polymer;

(b) The gel-free dope is wet-spun by supplying it to and through a spinneret at a temperature above the gelation temperature of the dope;

(c) The filaments obtained are stretched to a stretch value of at least 7 (i.e. at least 7 times their original length) at a temperature between room temperature and 100° C.;

(d) The heat-treatment comprises conditioning the stretched filaments at a temperature between 180° and 220° C. over a period between 0.1 and 10 seconds while maintaining said stretch value, then relaxing the conditioned filaments at a temperature between 100° and 120° C. over a period between 1 and 60 minutes.

The term "high-DS vinyl chloride polymer" as used herein is understood to embrace both homopolymers of vinyl chloride as well as copolymers of the latter with other suitable monomers and mixtures of high-DS PVC with other suitable polymers, provided the weight-amount of the vinyl chloride in such copolymers and mixture is not lower than 85% by weight.

Particularly suitable under this aspect are, for example, copolymers of vinyl chloride containing not more than 15% vinyl-type monomers such as vinyl acetate, methyl acrylate or vinylidene chloride, prepared by the hereinbefore mentioned low-tempermature polymerization technique at temperatures lower than —10° C. (preferably between —20° and —60° C.). The presence of small amounts of said vinyl-type monomers improves the dyeability of the obtained fibres with disperse dyestuffs. Similarily, acidic monomers such as cynnamic acid, itaconic acid, acrylic acid, sodium-p-sulfoxy-phenyl-vinyl ether and other carboxylic or sulphonic monomers may be introduced in a proportion up to about 2% by weight, to impart to the resulting copolymer receptivity towards basic dyes. Receptivity towards acidic dyes is imparted by compounding a high-DSPVC with cyclohexanone-soluble polymers or copolymers containing basic groups in their molecular structure, provided the amount of such polymers or copolymers is below 15% by weight; a 50/50 copolymers of acrylonitrile and 2-methyl-5-vinyl-pyridine, for example, is suitable to that end.

As to the mean molecular weight (M) of the high-DS vinyl chloride polymers contemplated herein, a minimum (M) of 50,000 was found to be necessary for good polymer processing and fibres properties, the optimum range being between 60,000 and 85,000. The molecular weight is determined on the basis of the intrinsic viscosity ($\eta$) value according to the equation of Danusso Moraglio (Chim. e Ind., vol. 36, 1954, p. 883):

$$(\eta) = 2.4 \times 10^{-4} \times M^{0.77}$$

wherein M stands for the mean molecular weight, ($\eta$) being expressed in dl./g. The intrinsic viscosity is determined at 25° C. by means of an Ostwald viscosimeter; the solution of the high-DS vinyl chloride polymer is formed by dissolving the latter in cyclohexanone at 156° C. and quickly cooling the solution down to 25° C.

The above indicated molecular weights of 60,000 and 85,000 correspond to ($\eta$) values of about 1.3 and about 1.6, respectively; a molecular weight of 50,000 corresponds to an ($\eta$) value of about 1.0 dl./g.

Vinyl chloride polymers which are best suited for the purposes of this invention are those obtained between −20° C. and −45° C., exhibiting a DS-value of at least 1.8 (preferably between 2.0 and 2.5) as determined according to Burleigh (J.A.C.S. 82 1960, p. 749).

This invention also provides novel textile fibres, consisting by 85% B.W. at least, of high-DS polyvinyl chloride of a mean molecular weight between 50,000 and 120,000, said fibres exhibiting the properties of:

(a) Tenacity of at least 2.5 g./den.;
(b) Elongation at break between 25% and 60%;
(c) Shrinkage in boiling water less than 2%;
(d) Shrinkage in trichloroethylene at 40° C. less than 2%;
(e) Flex-abrasion resistance exceeding 600 cycles, as will be better explained hereinafter.

Under this aspect, while the details of this invention will be discussed hereinafter, attention is directed to Table 1 below, giving a broad idea of the possibilities afforded by the invention; the tabulated values relate to fibre samples obtained from vinyl chloride homopolymers, the polymerization temperatures, DS-values and intrinsic viscosity values of which are indicated in the 2nd, 3rd and 4th column in the table. The tests were performed on samples previously immersed in boiling water for 30 minutes except for samples in classes A and B which were tested both before (samples $A_1^+$, $B_1^+$, $B_2^+$, $B_3^+$) and after (samples $A_1$, $B_1$, $B_2$, $B_3$) the boiling water treatment. Samples in classes C, D and E, obtained according to this invention show no significant difference in their tubulated values when tested before the boiling water treatment. An Instron dynamometer was employed; sample length=2 cm.; elongation rate=100% per minute.

Symbol BWS, stands for shrinkage in boiling water. The shrinkage value is determined as a percent-variation in length of a continuous PVC thread in skein form when immersed in boiling water for 5 minutes.

Symbol S 130 stands for shrinkage in air at 130° C. The shrinkage value is determined as percent-variation in length of a PVC-filament in a one-minute contact with a hot plate at 130° C.

Symbol S 150 stands for shrinkage in air at 150 C.; the test is performed as on S 130.

Symbol St 40 stands for shrinkage in trichloroethylene at 40° C.; the test is performed by immersing a skein of PVC-thread in trichloroethylene at 40° C. for 20 minutes and determining the percent-variation in length of the thread.

Symbol St 80 stands for shrinkage in trichloroethylene at 80° C.; the test is performed as on St 40.

TABLE 1

| Sample | Polymeriz. temper., °C. | DS | [$\eta$] | Tenacity, g./den. | Elongation at break, percent | Elast. Mod., g./den. | BWS, percent | S 130, percent | S 150, percent | St 40, percent | St 80, percent |
|---|---|---|---|---|---|---|---|---|---|---|---|
| $A_1$ | +50 | 1.5 | 1.2 | 1 | 160 | 18 | 2 | 50 | | 50 | 75 |
| $A_1^+$ | +50 | 1.5 | 1.2 | 2.6 | 27 | 33 | 50 | >80 | | 60 | >80 |
| $B_1$ | 0 | 1.68 | 1 | 1.2 | 90 | 20 | 1 | 25 | 50 | 20 | 40 |
| $B_1^+$ | 0 | 1.68 | 1 | 2.5 | 22 | 35 | 25 | 40 | 63 | 27 | 55 |
| $B_2$ | 0 | 1.72 | 1.25 | 1.3 | 72 | 22 | 1 | 23 | 56 | 25 | 50 |
| $B_2^+$ | 0 | 1.72 | 1.25 | 2.65 | 26 | 33 | 23 | 41 | 60 | 28 | 53 |
| $B_3$ | 0 | 1.70 | 1.40 | 1.5 | 65 | 22 | 0.5 | 24 | 48 | 22 | 45 |
| $B_3^+$ | 0 | 1.70 | 1.40 | 2.7 | 28 | 35 | 22 | 39 | 58 | 25 | 54 |
| $C_1$ | −20 | 1.98 | 0.8 | 1.9 | 25 | 25 | 0.5 | 8 | 11 | 1.5 | 25 |
| $C_2$ | −20 | 1.95 | 1.5 | 3 | 40 | 30 | 0.5 | 6 | 9 | 0.5 | 23 |
| $D_1$ | −30 | 2.12 | 0.8 | 2.0 | 30 | 25 | 0.5 | 7 | 10 | 2 | 16 |
| $D_2$ | −30 | 2.15 | 1.35 | 3.1 | 35 | 33 | 0 | 5 | 9 | 0 | 15 |
| $E_1$ | −40 | 2.35 | 0.9 | 2.1 | 29 | 26 | 0 | 5 | 9 | 1 | 10 |
| $E_2$ | −40 | 2.40 | 1.4 | 3.5 | 35 | 35 | 0 | 4 | 8 | 0 | 10 |

In the accompanying drawings:

FIGURE 1 diagrammatically shows an apparatus for carrying out a preferred embodiment of the method according to this invention;

FIGURE 2 is a diagrammatic representation of an apparatus employed for flex-abrasion tests, the results of which are given further on.

Figure 1:
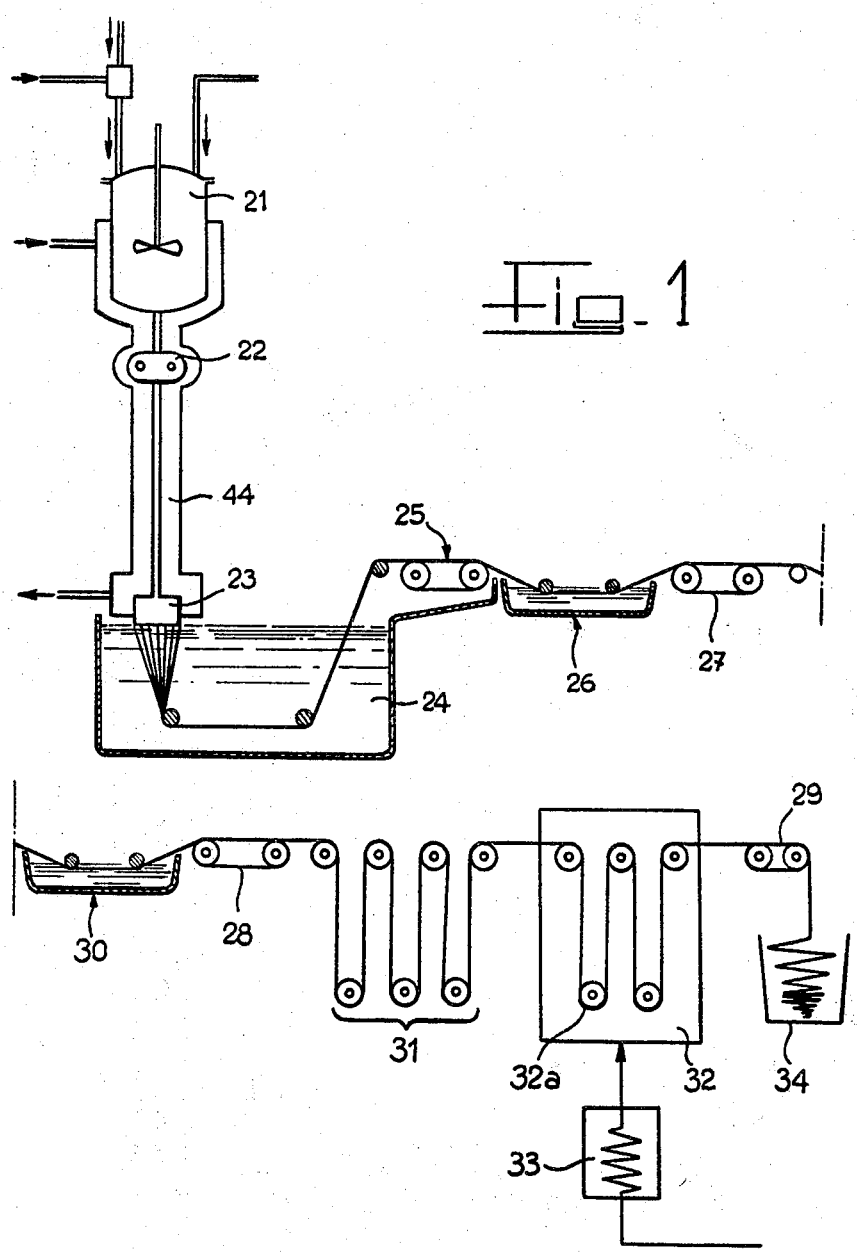

One of the most important features of this invention resides in that the spinning dope shall contain between 15% and 20% by weight of the high-DS vinyl chloride polymer (hereinafter briefly referred to as high-DS PVC) exhibiting the hereinbefore stated molecular weight and intrinsic viscosity. Higher concentration dopes can be prepared in cyclohexanone at the boiling temperature (156° C.) of the latter; however, such dopes are easily subject to gel formation already on slight drops in temperature, so that an effective control of their gel-free condition is practically impossible. On the other hand, dopes containing less than 15% high-DS PVC are excessively fluid at relatively high temperatures and change to gel-condition within a restricted interval of temperature (about 2-3° C.). 15–20% dopes as suggested hereinbefore exhibit an excellent viscosity within a wide temperature interval, so that they can be easily formed and conveyed to the spinneret without requiring an extremely critical temperature control.

Table 2 below gives an idea of gel-temperatures of high-DS PVC solutions in cyclohexanone:

TABLE 2

| Polymerization temperature, °C. | [$\eta$] | Concentration, percent | Gelation temperature, °C. |
|---|---|---|---|
| −20 | 1.2 | 12 | ca. 40 |
| −20 | 1.2 | 18 | ca. 70 |
| −20 | 2.0 | 12 | ca. 80 |
| −20 | 2.0 | 18 | ca. 135 |
| −40 | 1.2 | 12 | ca. 80 |
| −40 | 1.2 | 18 | ca. 120 |
| −40 | 2.0 | 12 | ca. 100 |
| −40 | 2.0 | 18 | ca. 150 |

The influence of the dope concentration on fibre properties will become apparent from the following Table 3, referring to dopes at 12% and 18% concentrations, both prepared from a −40° C. high-DS PVC exhibiting an intrinsic viscosity of 1.4 dl./g.

TABLE 3

|  | 12% dope | 18% dope |
| --- | --- | --- |
| Spinning temperature (optimum), ° C. | 104 | 140 |
| Max. stretch ratio | 7 | 9 |
| Tensile strength (g./den.) | 2.2 | 3.8 |
| Elongation at break (percent) | 22 | 30 |
| Elast. Modulus (g./den.) | 30 | 35 |
| Fragility | High | Insignificant |

It will be seen that a 12%-dope gives rise to filaments which are incapable of being stretched by over 7 times their original length and the resulting textile thread is brittle and exhibits tenacity and elongation values decidedly lower than the minimum values (2.5 g./den. and 25%, respectively) aimed at by this invention.

It is highly important for the spinning dope, once formed, to be supplied to and through the spinneret in its gel-free condition. To that end, as will be better seen with reference to FIG. 1, a heating jacket is provided throughout the dope path and spinneret, the spinneret assembly being arranged out of the coagulating bath and contacting the latter only with the front surface of the spinneret, so that the dope temperature on the dope path towards and through the spinneret can be accurately controlled by circulating in the jacket a heating fluid at a temperature above the gel-temperature of the dope. With dopes compounded according to this invention, the minimum temperature in the jacket is about 100° C. (as referred to the minimum solvation-temperature 110° C. of the high-DS PVC in cyclohexanone as previously stated).

Another factor worthy of attention resides in the coagulating bath. It is known in the art of synthetic textile fibers that the composition and temperature of the coagulating bath appreciably affect properties of the fibers, such as the luster of the filaments, abrasion resistance, flexibility, hand, etc. In the case of the high-DS PVC spinning process according to this invention, the coagulating bath will necessarily comprise cyclohexanone. Since the latter is only very slightly soluble in water, intended as a coagulating component, other coagulating components must be resorted to, such as alcohols, ketones and various organic and inorganic acids miscible with cyclohexanone. The most commonly used baths are "binary" mixtures of cyclohexanone with solvents such as acetone, methyl alcohol, ethyl alcohol and acetic acid. A drawback of such baths resides in an easy vaporization of their volatile constituents in spinning conditions; in the case of this invention, thousands of filaments are spun into the bath at a filament temperature above 100° C. Thus, on one hand, components such as acetone or ethyl alcohol vaporize in contact with the filaments, and, on the other hand, the coagulation control becomes rather difficult; the resulting filaments are often irregular in cross-section, opaque and hardly stretchable. Still on the other hand, the bath composition in the instant process is important also on account of that the desired range of bath temperature is of 35° C. to 80° C., preferably 40° to 70° C.

Consequently, according to a feature of this invention, a coagulating bath is employed essentially consisting of a ternary solution of cyclohexanone, water and a mutual solvent for the two, the solvent being present in an amount warranting a complete miscibility of cyclohexanone and water at the bath temperature within a range 15%–50% cyclohexanone and, correspondingly, 70%–20% water, as referred to the weight of the solution.

In other words, a most efficient coagulation control is obtained with a coagulating bath comprising 15% at least cyclohexanone and 20% at least water, the balance being constituted by said mutual solvent, provided not more than 50% cyclohexanone and not more than 70% water are present. The said mutual solvent is preferably selected among: methyl alcohol, ethyl alcohol, isopropyl alcohol, ter-butyl alcohol, polyethylene glycol of a molecular weight between 400 and 1500, acetone, acetic acid, phosphoric acid, hypophosphorous acid, nitric acid and sulfuric acid.

Figure 3:
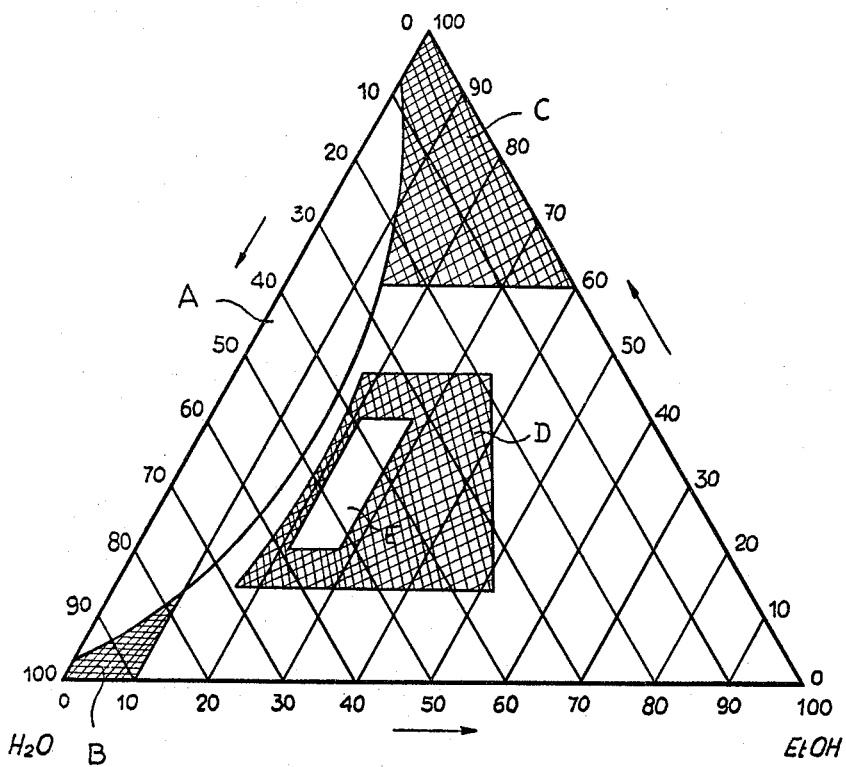
FIGURE 3 is a miscibility diagram of a ternary mixture of cyclohexanone, water and ethyl alcohol.

A typical miscibility diagram required by this invention is shown in FIG. 3, referring to a ternary mixture of cyclohexanone, water and ethyl alcohol at 50° C., wherein the non-miscibility zone is denoted by A. Zones denoted by B and C, although situated in the miscibility zone of the diagram, define bath compositions unsuitable for the purposes of this invention. The preferred composition zone is denoted by D and corresponds to the hereinbefore defined percent-composition of the bath; it has been found that location of the zone D does not change when any of the hereinbefore listed mutual solvents is used instead of ethyl alcohol. Excellent results have been obtained with coagulating baths, the composition of which corresponds to the zone denoted by E in the diagram.

The filaments obtained by coagulation in a bath corresponding to zone D on the diagram are extraordinarily regular in cross-section and of a brilliant appearance. By way of example, the average composition of the filaments leaving the bath is:

Polymer _____ 38% B.W. (±5%)
Water _____ 14% B.W. (±5%)
Cyclohexanone _____ 40% B.W. (±5%)
Ethyl alcohol _____ 8% B.W. (±3%)

As compared with prior proposals, one of the distinguishing features of the method according to this invention resides in the nature and mutual subordination of the three essential processing stages following coagulation, viz. stretching, conditioning and relaxing.

As previously stated herein, stretching is performed to a stretch value of at least 7, at a temperature not exceeding 100° C. According to one embodiment of the invention, the filaments are stretched by a single stage at 98°–100° C., preferably in hot water or saturated steam atmosphere. Alternatively, three or four stretching stages are provided, each at a temperature not exceeding 100° C.

Table 4 depicts some effects of the stretch value on filaments obtained from a −40° C. high-DS PVC of 1.35 dl./g. intrinsic viscosity when processed according to the invention.

TABLE 4

| Stretch value | Tenacity, g./den | Elong. at break, percent | El./Mod., g./den | Percent | | | | |
| --- | --- | --- | --- | --- | --- | --- | --- | --- |
| | | | | BWS | S 130 | S 150 | St 40 | St 80 |
| 5 | 2.4 | 55 | 24 | 0 | 10 | 18 | 5 | 20 |
| 6 | 2.8 | 40 | 26 | 0 | 7 | 15 | 3 | 15 |
| 7 | 3.2 | 33 | 30 | 0 | 5 | 10 | 0 | 10 |
| 8 | 3.5 | 30 | 35 | 0 | 4 | 8 | 0 | 8 |
| 9 | 3.7 | 25 | 40 | 0 | 3 | 6 | 0 | 6 |

Multi-stage stretching assists the removal of the solvent from the filaments, as will be seen from Table 5.

TABLE 5

| Number of | Stage stretch values | Total stretch value | Residual cyclohexanon percent b.w. |
| --- | --- | --- | --- |
| One | 8 | 8 | 1.5 |
| Two | 4 x 2 | 8 | 1.0 |
| Three | 1.5 x 1.5 x 3.55 | ca. 8 | 0.8 |
| Four | 1.5 x 1.5 x 1.5 x 2.35 | ca. 8 | 0.5 |

After being stretched, the filaments are advantageously passed in a finishing bath, containing a conventional finishing agent (i.e. an agent having antistatic, softening and lubricating properties) and then dried in air- or inert gas environment at a temperature between 100° and 140° C., both said treatments being performed while maintaining substantially inalterate the stretch value imparted to the filaments at the stretching stage. As will be seen in the further course of this description, a stabilizing agent is usually and advantageously added to cyclohexanone in the dope-forming stage; since part of said agent is lost by the filaments in the coagulating bath, it is advantageous to compensate said loss by adding a corresponding amount of the stabilizing agent to the finishing bath mentioned above.

The next operation in the instant method consists in heat-conditioning the filaments at unusually high temperatures, viz 180°–220° C. over a short period of time ranging between 0.1 and 10 seconds, depending on the temperature; the higher the temperature the shorter the time. The operation is advantageously performed in superheated steam or inert gas. Its effectiveness is practically independent on the denier of the filaments within the "textile fineness" range (up to at least 30 den./filament). The filaments are kept under tension throughout the conditioning operation thereby to maintain their original stretch value, and are relaxed in a subsequent stage at a temperature between 100° C. and 120° C. for a period between 1 and 60 minutes. To that end, the heat-conditioned filaments are advantageously collected in tow-form in an open container which is placed into an autoclave through which steam is circulated. Alternatively, a continuous-treatment chamber may be employed, if desired, through which the filaments travel in a slackened condition.

The following Table 6 gives an idea of the importance of the specific conditions and mutual subordination of the stretching, conditioning and relaxing stages of the instant method. The table relates to filaments obtained from —40° C. high-DS PVC of 1.35 dl./g. intrinsic viscosity, spun into a ternary coagulating bath comprising 35% cyclohexanone, 40% water and 25% ethyl alcohol. Column (a) in the table relates to filaments having undergone a stretching operation only at 98° C.; column (b) relates to filaments stretched as above and subsequently relaxed at 115° C.; column (c) relates to filaments stretched as above and subsequently conditioned at 200° C. for 6 seconds; column (d) relates to filaments having undergone all the three steps in their sequence as described hereinbefore.

TABLE 6

| | (a) | (b) | (c) | (d) |
|---|---|---|---|---|
| Filament fineness (den.) | 3.0 | 3.6 | 3.0 | 3.2 |
| Tenacity (g./den.) | 4.8 | 3.1 | 4.6 | 4.3 |
| Elongation at break (percent) | 20.5 | 58.0 | 25.0 | 35.0 |
| Elast. Modulus (g./den.) | 45 | 30 | 45 | 35 |
| BWS (percent) | 9.5 | 0 | 4 | 0 |
| St 40 (percent) | 9 | 4 | 4 | 0 |
| St 80 (percent) | 30–35 | 27–30 | 12–16 | 5–10 |
| S 130 (percent) | 20–24 | 10–14 | 8–10 | 3–6 |
| Flex-abrasion (cycles) | 110 | 800 | 300 | 1,200 |
| Fragility | (¹) | (²) | (³) | (⁴) |

¹ High.  ² Medium.  ³ High.  ⁴ Very low.

Figure 2:
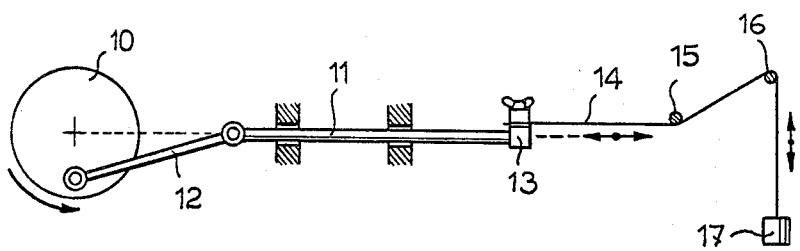

The flex-abrasion resistance is determined by means of the apparatus shown in FIG. 2. The apparatus comprises a motor-driven crank-wheel 10 actuating a horizontal reciprocating rod 11 by means of a connecting rod 12. The reciprocating rod 11 has a connector 13 at its free end, to which one end of a thread 14 under test is fastened. The thread is deflected upwardly through 30° about a horizontally taut steel wire (piano-wire) 15, and is then deflected vertically downwardly about a second horizontally taut steel wire 16. The diameter of the wires is 0.1 mm. The thread consists of 10 (ten) parallel filaments and has a weight 17 attached to its free end, the weight value being 0.05 grams/den. In operation, the thread is reciprocated about the wires 15, 16, the flex-abrasion value being given by the number of to-and-fro cycles performed to rupture of the thread.

Textile fibres obtained by the process described hereinbefore are of a surprisingly good color. However, it is advantageous to employ suitable stabilizers in compounding the dope in order to avoid even slightly colored fibres. Only few of the stabilizers known on the market proved to be suitable for the instant method. So, for example, compounds such as lead sulfate, lead salicylate, lead phosphite, phenyl salicylate, cadmium ethyl-benzoate, were found useless.

The most effective stabilizing agents in the instant method are the compounds selected from the following classes:

(a) Phenates of zinc, barium and cadmium;
(b) Tin-organic compounds having structural formulae:

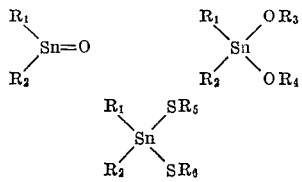

wherein $R_1$ and $R_2$ are selected among alkyl, aryl and aralkyl radicals, $R_3$ and $R_4$ are selected among alkyl and acyl radicals, and $R_5$ and $R_6$ are selected among alkyl radicals. Representatives of the class (b) are dibutyl-Sn-mercaptanes, dibutyl-Sn-maleate and dibutyl-Sn-oxide. The stabilizers are added to the dope-forming cyclohexanone in an amount between 0.1 and 2% B.W. referred to the high-DS PVC. In compounding the dope, preferably the stabilizer is dissolved in cyclohexanone before dissolving the polymer.

FIGURE 1 in the drawings diagrammatically shows the instant method performed in a continuous manner. A solution of cyclohexanone and stabilizer on one hand, and high-DS PVC on the other hand, are supplied in metered amounts to a mixer 21 maintained at a temperature between 110° and 156° C. The dope is pumped by a pump 22 to a spinneret 23, both the mixer 21, pump 22 and spinneret 23 as well as the dope-conveying conduits being surrounded by a heating jacket 44 through which a suitable heating fluid is circulated.

The spinneret 23 is arranged in a downwardly directed position just at the level of the coagulating bath 24. The coagulated filaments are taken-up by a pair of rolls 25 driven at a predeterminated circumferential speed, said rolls providing intake rolls for a stretching tray 26 to which hot water is supplied; stretching is effected under the action of a pair of take-off rolls 27, driven at a circumferential speed which is at least seven times higher than the speed of the rolls 25. Further two pairs 28, 29 of driven rolls are arranged on the path of the filaments, the circumferential speeds of which substantially equal that of the take-off rolls 27, so that the stretch-value imparted to the filaments by the latter rolls is maintained over the path. A finishing bath tray 30 is interposed between the rolls 27 and 28. The filaments delivered by the rolls 28 are dried in air at a drying stage 31 comprising a plurality of internally heated rolls over which the filaments travel. Reference 32 denotes a conditioning-chamber interposed between the drier 31 and terminal pair of rolls 29; the chamber 32 comprises a plurality of rolls 32a about which the travelling filaments are looped, superheated steam being supplied to the chamber from a superheater 33. The filaments delivered by the terminal rolls 29 are collected in a container 34, preferably made of a foraminated sheet metal, the container being suitable for being placed in an autoclave (not shown) in which the filaments are relaxed as described hereinbefore.

Example 1

The apparatus employed is similar to that diagrammatically shown in FIGURE 1.

100 parts by weight of vinyl chloride polymer obtained at —40° C. and showing a DS of about 2.2 and an intrinsic viscosity of 1.4 dl./g. are dissolved at 137° C. in 450 parts by weight of cyclohexanone containing 0.4% by weight 'Mark KCB" stabilizer, which is a barium, zinc and cadmium fenate distributed by Argus. Dissolving is effected in a mixer 21 (FIGURE 1) while stirring during 30 minutes. The resulting dope is filtered at 135°–137° C. and pumped to a spinneret 23 maintained at 130° C. The spinneret is formed with 15,000 holes, each of a 100 micron diameter; supply is effected at a rate of 1,200 g./min. dope corresponding to 216 g./min. polymer.

The coagulating bath 24 is a ternary solution comprising 50% by weight water, 24% cyclohexanone and 26% ethyl alcohol, and is maintained at a temperature of 60° C. The bundle of filaments issuing from the bath 24 is taken up by a set of rollers 25 revolving at a circumferential speed of 6 meters/min.; the filaments on the rollers are abundantly sprayed with a solution of deionized water and ethyl alcohol at 60° C. Stretching is carried out in tray 26 which is about 4 meters long, containing boiling water. The take-off rollers 27 revolve at a circumferential speed of 48 m./min., so that the stretching ratio amounts to 8 (eight). The next roller pairs, denoted by 28 and 29 in FIG. 1, revolve at the abovementioned circumferential speed of 48 m./min. The tow delivered by the rollers 27 travels through a finishing bath 30 containing a dilute aqueous solution of "Mark KCB" stabilizer and antistatic agent "Antistatico PB" (which is a quaternary ammonium compound distributed by F.11i Lamberti, Albizzate); the proportion of stabilizer and antistatic agent is such that the filaments issuing from the finishing bath contain about 0.5% by weight of each one. Drying of the stretched filaments is carried out in a drier 31, the rollers in which are heated to a temperature of 140°–145° C. After drying the tow is conditioned in a conditioner 32 during six seconds with superheated steam at a temperature of 200°–210° C. The tow issuing from the conditioner 32 cools to room temperature on its path towards the rollers 29 and is then discharged into containers 34. The latter are placed into an autoclave fed with saturated steam at 110° C.; relaxing in the autoclave lasts 30 minutes and amounts to about 7%.

The resulting filaments cut to staple form exhibit the following features:

| | | |
|---|---|---|
| Fineness | den./filament | 3.0 |
| Standard deviation of denier (measured on 100 filaments with a vibroscope) | den | 0.40 |
| Tenacity | g./den | 3.5 |
| Elongation at break | percent | 34 |
| Elastic modulus | g./den | 35 |
| Flex-abrasion resistance | cycles | 1,100 |
| BWS | percent | 0.0 |
| S 130 | do | 4 |
| St 40 | do | 0.0 |
| Original color (measured on a General Electric spectrophotometer against a MgO standard): | | |
| Dominant wave length | millimicrons | 565 |
| Purity index | percent | 96.5 |
| Brightness | do | 84 |

A yarn Ne30 (cotton system) obtained from the above staple exhibits an irregularity of 11% (measured on an Uster regularimeter). The yarn exhibits the following properties:

| | | |
|---|---|---|
| Breaking length | km | 16 |
| Elongation at break | percent | 22 |
| BWS | do | 2.2 |
| St 40 | do | 1.5 |

Samples from the above staples were dyed at a temperature of 98° C. with 2% of a dyestuff known in the trade as Violet Foron BL (distributed by Sandoz); the resulting coloring was uniform and deep throughout the cross section of the filament. Standard fastness tests gave the following results:

| | |
|---|---|
| (1) Wash fastness | 5 |
| (2) Rub off (crocking) fastness | 5 |
| (3) Sweat fastness | 5 |
| (4) Alkali fulling fastness | 4–5 |
| (5) Fastness to ironing at 130° C. | 4 |
| (6) Dry cleaning fastness | 4 |
| (7) Fadeometer fastness | 4 |

The fastness values (1) to (6) listed above are referred to the grey scale, while the value sub (7) is referred to the blue scale in accordance with the Unitex Standard "Fastness Code."

Example 2

The same procedure as described in Example 1 is followed; however, the coagulating bath is a ternary solution comprising 40% by weight water, 30% acetic acid and 30% cyclohexanone.

Staple filaments of the following properties are obtained:

| | | |
|---|---|---|
| Fineness | den./filament | 3 |
| Standard deviation of fineness | den | 0.15 |
| Tenacity | g./den | 3.5 |
| Elongation at break | percent | 27 |
| Elastic modulus | g./den | 33 |
| Flex-abrasion resistance | cycles | 1,200 |
| BWS | percent | 0.0 |
| S 130 | do | 4.5 |
| St 40 | do | 0.0 |
| Original color: | | |
| Dominant wave length | millimicrons | 570 |
| Purity index | percent | 97 |
| Brightness | do | 83.5 |

Example 3

A polymer blend was prepared comprising 92% by weight polyvinyl chloride (DS about 2.2; intrinsic viscosity 1.6 dl./g.) and 8% by weight polymethylmetacrylate (intrinsic viscosity 0.5 dl./g., measured in 0.1% dimethylformamide solution at 25° C.).

100 parts by weight of this blend were dissolved in 450 parts by weight cyclohexanone at 135° C. while stirring during 30 minutes. The resulting dope was treated in the manner described in Example 1. The filaments obtained were of the following properties:

| | | |
|---|---|---|
| Fineness | den./filament | 3.0 |
| Standard deviation of fineness | den | 0.32 |
| Tenacity | g./den | 3.6 |
| Elongation at break | percent | 40 |
| Modulus of elasticity | g./den | 32 |
| Flex-abrasion resistance | cycles | 1,000 |
| BWS | percent | 0.5 |
| S 130 | do | 5 |
| St 40 | do | 1 |
| Original color: | | |
| Dominant wave length | millimicrons | 568 |
| Purity index | percent | 96.8 |
| Brightness | do | 85 |

Example 4

100 parts by weight polyvinyl chloride obtained at −20° C., of a DS=1.96 and intrinsic viscosity of 1.6 dl./g. are dissolved in 400 parts by weight cyclohexanone at 135° C. while stirring during 30 minutes, the cyclohexanone containing 0.5 part by weight "Mark KCB."

The same procedure is followed as described in Example 1; however:

the coagulating bath comprises 35% by weight cyclohexanone, 37% water and 28% ethyl alcohol;
drying is carried out on rollers heated at 110° C.;
conditioning is carried out in superheated stream at 190° C. during a period of 6 seconds;
relaxing is carried out at 105° C.

The resulting staple is of the following properties:

| | | |
|---|---|---|
| Fineness | den./filament | 3.5 |
| Tenacity | g./den | 3.4 |
| Elongation at break | percent | 35 |

| | | |
|---|---|---|
| Modulus of elasticity | g./den. | 32 |
| BWS | percent | 0.5 |
| S 130 | do | 6.0 |
| St 40 | do | 0.2 |
| Flex-abrasion resistance | cycles | 1,300 |

Example 5

The same procedure is followed as described in Example 1, the coagulating bath comprising, however, 45% by weight water, 20% cyclohexanone and 35% phosphoric acid and being maintained at a temperature of 60° C.

The resulting staple is of the following properties:

| | | |
|---|---|---|
| Fineness | den./filament | 3.1 |
| Standard deviation of fineness | den | 0.33 |
| Tenacity | g./den | 3.8 |
| Elongation at break | percent | 27 |
| Modulus of elasticity | g./den | 35 |
| Flex-abrasion resistance | cycles | 1,200 |
| BWS | percent | 0 |
| S 130 | do | 3.5 |
| St 40 | do | 0 |

Original color:

| | | |
|---|---|---|
| Dominant wave length | millimicrons | 564 |
| Purity index | percent | 97.2 |
| Brightness | do | 83.2 |

Example 6

100 parts by weight of a copolymer comprising 95% by weight vinyl chloride and 5% by weight vinyl acetate, obtained at −40° C., of a DS=2.15 and intrinsic viscosity of 1.6 dl./g., are dissolved while stirring during 30 minutes at 135° C. in cyclohexanone stabilized with 0.50 part by weight "Mark KCB."

The same procedure is followed as described in Example 1; however:

the coagulating bath comprises 40% by weight cyclohexanone, 35% water and 25% ethyl alcohol;
drying is carried out at 110° C.;
conditioning is carried out at 185° C. during 4 seconds;
relaxing is carried out at 105° C. during 20 minutes.

The resulting staple is of the following properties:

| | | |
|---|---|---|
| Fineness | den./filament | 2.9 |
| Tenacity | g./den | 2.5 |
| Elongation at break | percent | 49 |
| Modules of elasticity | g./den | 30 |
| Flex-abrasion resistance | cycles | 1,500 |
| BWS | percent | 0.5 |
| S 130 | do | 6 |
| St 40 | do | 1 |

Moreover, the resulting fibres are superior to the fibres obtained in accordance with Example 1 as far as receptivity to disperse dyes, depth of shade and color fastness is concerned.

Example 7

100 parts by weight of a vinyl chloride polymer obtained at −40° C. and showing a DS of about 2.4 and an intrinsic viscosity of 1.4 dl./g. are dissolved in 400 parts by weight cyclohexanone which has been previously admixed with 0.4 part by weight "Mark KCB." Dissolving is carried out at 135° C. while stirring during 30 minutes.

A sample of the resulting dope is placed into a standard glass tube for testing against Gardner's reference scale (Judd, "Coloring Business Science and Industry" 1959, p. 217), this scale attributing value 1 (one) to a colorless product and value 18 to a deep brown-red colored product. The color of the dope obtained as described above is between 1 and 2 (almost colorless solution) and remains such even after 3 hours at 120° C. After 6 hours at 120° C. the color becomes 4, after 8 hours it becomes 6.

Samples of similar solutions stabilized with lead sulphate, lead salicylate, lead phosphite, lead phthalate, phenyl salicylate, cadmium ethyl benzoate, respectively, are initially of color 7 which rises to 12 after one hour at 120° C.

Example 8

100 parts by weight of vinyl chloride polymer of a DS of about 2.4 and an intrinsic viscosity of 1.4 dl/g. are dissolved in 400 parts by weight cyclohexanone along Example 7; however, the stabilizer employed is now "Mark Q 180" (barium phenate) in a proportion of 0.6 part by weight.

The color test, carried out along Example 7, gives an initial value between 2 and 3 which, after 3 hours at 120° C. becomes 4–5, the color value degrading to 9 after 8 hours at 120° C.

Example 9

100 parts by weight of the polymer according to Example 8 are dissolved at 135° C. in 450 parts by weight cyclohexanone admixed with 0.4 part by weight dibutyl-Sn-mercaptane.

The color test, carried out along Example 7, gives an initial value of 1 (one) which after three hours at 120° C. becomes 2 and after 6 hours becomes 3.

Example 10

100 parts by weight of a vinyl chloride polymer of a DS of about 2.4 and intrinsic viscosity of 1.4 dl./g. are dissolved while stirring at 137° in 450 parts by weight cyclohexanone stabilized with 0.4% by weight "Mark KCB."

The resulting solution is spun along Example 1 at a rate of 1,200 g./min. corresponding to 216 g./min. polymer.

The coagulating bath comprises 50% by weight water, 24% cyclohexanone and 26% ethyl alcohol, and is maintained at 60° C.

The filament tow issuing from the coagulating bath is taken up by a set of four rollers driven at a circumferential speed of 6 m./min. and subsequently stretched to a total stretch value of 8 in four stages by means of four rollers pairs driven at circumferential speeds of 9 m./min., 13.5 m./min., 20 m./min. and 48 m./min., respectively. The first three stretching stages are carried out at room temperature, the fourth stage being carried out in boiling water.

After stretching the tow is treated as described in Example 1.

The resulting staple is of the following properties:

| | | |
|---|---|---|
| Fineness | den./filament | 3.0 |
| Standard deviation of fineness | den | 0.1 |
| Tenacity | g./den | 3.3 |
| Elongation at break | percent | 35 |
| Elastic modulus | g./den | 37 |
| Flex-abrasion resistance | cycles | 1,200 |
| BWS | percent | 0 |
| S 130 | do | 3.5 |
| St 40 | do | 0 |

Original color:

| | | |
|---|---|---|
| Dominant wave length | millimicrons | 564 |
| Purity index | percent | 97 |
| Brightness | do | 84 |

The fibres obtained according to this invention are of superior standard due to their high tensile strength, high modulus of elasticity, excellent elastic and resiliency recovery, dimensional stability at high temperatures, power to withstand organic solvents, soft hand of the fibres, apart from the inherent flame resistance of the polymer employed in manufacture. The fibres are therefore open to a large number of various uses, both in the textile and other technical fields, blended with wool, cotton or synthetic fibres of another kind, if desired.

Their preferred uses are for knitted underwear and outwear, tufted and puff-type carpets and, generally "high pile fabrics" in connection with which highly favorable results have already been obtained by the use of this invention. Fibres according to the invention have further been used in blends with wool for manufacturing either light or heavy fabrics, which are capable of being thermo-stabilized and are then of excellent crease recovery and crease resistance properties.

One of the advantageous uses of the fibres is in blends with cellulosic or acrylic fibres, more particularly in the field of high pile fabrics, whereby a complete protection against flammability of the manufactured items is obtained with as low a proportion of high-DS PVC fibres as 20–30% by weight.

The fibres according to this invention can further be employed, for instance, in manufacturing filter cloth for industrial use on account of their high power of withstanding acids and alkalis and their excellent mechanical properties. Elasticity, softness and flame resistance of the fibres make them suitable for padding and upholstery purposes. Further fields of use are ropes, fishing nets and high-denier mono-filaments, such as for fishing lines.

Finally, with the method of this invention solution-dyed fibres can be obtained, for which purpose a suitable pigment shall simply be added to the dope. Articles made from the fibres are particularly attractive through their brilliant and lustrous appearance.

What we claim is:

1. A textile fibre consisting of at least 85 percent by weight of uncrosslinked polyvinyl chloride having a mean molecular weight of from between 50,000 and 120,000, determined on the basis of intrinsic viscosity, a predominantly syndiotactic structure and a low degree of lateral branching and a D635 to D693 absorption ratio of from 1.8 to 3.0 as determined by infra-red absorption analysis and mechanical stability above its transition temperature; said textile fibre characterized by (a) non-flammability; (b) uniform cross-section and coloring; (c) a tensile strength of from 2.5 to about 4.3 grams per denier; (d) an elongation at break of from between 25 percent and 60 percent; (e) a shrinkage in boiling water of at maximum about 1 percent; (f) a shrinkage in trichloroethylene of less than 2 percent at 40° C.; and (g) flex-abrasion resistance in excess of 600 cycles with a weight corresponding to 0.05 gram per denier.

2. Method of manufacturing polyvinyl chloride textile fibres comprising:
   (a) dissolving in cyclohexanone at a temperature between 110° and 156° C. a high-DS vinyl chloride polymer of a mean molecular weight between 50,000 and 120,000 to obtain a gel-free spinning dope comprising between 15% and 20% by weight of said polymer;
   (b) wet-spinning the dope in the gel-free condition into a coagulating bath for said polymer comprising cyclohexanone and water maintained at a temperature below 80° C. to obtain a filamentary product;
   (c) stretching said filamentary product to a stretch value of at least 7 at a temperature between room temperature and 100° C.;
   (d) conditioning the so stretched product at a temperature between 180° and 220° C., over a period of time between 0.1 and 10 seconds while maintaining said stretch value;
   (e) relaxing the conditioned product at a temperature between 100° and 120° C. over a period of time between 1 and 60 minutes.

3. Method of manufacturing polyvinyl chloride textile fibres comprising:
   (a) dissolving in cyclohexanone at a temperature between 110° and 156° C. a high-DS vinyl chloride polymer of a mean molecular weight between 50,000 and 120,000 to obtain a gel-free spinning dope comprising between 15% and 20% by weight of said polymer;
   (b) wet-spinning the dope in the gel-free condition into a coagulating bath for said polymer comprising cyclohexanone, water and a mutual solvent therefor maintained at a temperature below 80° C. to obtain a filamentary product;
   (c) stretching said filamentary product to a stretch value of at least 7 at a temperature between ambient temperature and 100° C.;
   (d) finishing the product in an aqueous finishing bath while maintaining said stretch value;
   (e) drying the product at a temperature between 100° and 140° C. while still maintaining said stretch value;
   (f) conditioning the dried product at a temperature between 180° and 220° C. over a period of time between 0.1 and 10 seconds while still maintaining said stretch value;
   (g) relaxing the conditioned product at a temperature between 100° and 120° C. over a period of time between 1 and 60 minutes.

4. Method of manufacturing polyvinyl chloride textile fibres comprising:
   (a) dissolving in cyclohexanone at a temperature between 110° and 156° C. a high-DS vinyl chloride polymer of a mean molecular weight between 50,000 and 120,000 to obtain a gel-free spinning dope comprising between 15% and 20% by weight of said polymer;
   (b) wet-spinning the dope in the gel-free condition into a coagulating bath for said polymer comprising 15–50% cyclohexanone, 70–20% water and at least a sufficient quantity of a mutual solvent to insure miscibility thereof maintained at a temperature between 40° and 80° C. to obtain a filamentary product;
   (c) stretching said filamentary product to a stretch value of at least 7 at a temperature between ambient temperature and 100° C.;
   (d) finishing the product in an aqueous finishing bath while maintaining said stretch value;
   (e) drying the product at a temperature between 100° and 140° C. while still maintaining said stretch value;
   (f) conditioning the dried product at a temperature between 180° and 220° C. over a period of time between 0.1 and 10 seconds while still maintaining said stretch value;
   (g) relaxing the conditioned product at a temperature between 100° and 120° C. over a period of time between 1 and 60 minutes.

5. Method of manufacturing polyvinyl chloride textile fibres comprising:
   (a) dissolving in cyclohexanone at a temperature between 110° and 156° C. a high-DS vinyl chloride polymer of a mean molecular weight between 50,000 and 120,000 to obtain a gel-free spinning dope comprising between 15% and 20% by weight of said polymer;
   (b) wet-spinning the dope in the gel-free condition into a coagulating bath for said polymer maintained at a temperature between 40° and 80° C. to obtain a filamentary product;
   (c) said spinning bath consisting of a ternary solution comprising: 15–50% cyclohexanone, correspondingly 70–20% water, and at least a sufficient quantity of a mutual solvent to insure miscibility thereof;
   (d) stretching said filamentary product to a stretch value of at least 7 at a temperature between ambient temperature and 100° C.;
   (e) finishing the stretched product in an aqueous finishing bath while maintaining said stretch value;
   (f) drying the product at a temperature between 100° and 140° C. while still maintaining said stretch value;
   (g) conditioning the dried product at a temperature between 180° C. and 220° C. over a period of time between 0.1 and 10 seconds while still maintaining the said stretch value;

(h) relaxing the conditioned product at a temperature between 100° and 120° C. over a period of time between 1 and 60 minutes.

6. Method of manufacturing polyvinyl chloride textile fibres comprising:

(a) dissolving in cyclohexanone a stabilizing amount of a stabilizing agent selected from the group consisting of:
(I) phenates of zinc, barium and cadmium;
(II) tin-organic compounds having structural formulae:

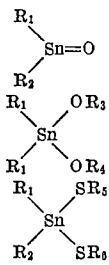

wherein $R_1$ and $R_2$ are selected among alkyl, aryl and aralkyl radicals, $R_3$ and $R_4$ are selected among alkyl and acyl radicals, $R_5$ and $R$ are selected among alkyl radicals;

(b) dissolving in the stabilizer-containing cyclohexanone at a temperature between 110° and 156° C., a high-DS vinyl chloride polymer of a mean molecular weight between 50,000 and 120,000 to obtain a gel-free stabilized spinning dope comprising between 15% and 20% by weight of said polymer;

(c) wet-spinning the dope in the gel-free condition into a coagulating bath for said polymer comprising 15–50% cyclohexanone, 70–20% water and at least a sufficient quantity of a mutual solvent to insure miscibility thereof maintained at a temperature below 80° C. to obtain a filamentary product;

(d) stretching said filamentary product to a stretch value of at least 7 at a temperature between ambient temperature and 100° C.;

(e) conditioning the so stretched product at a temperature between 180° and 220° C. over a period of time between 0.1 and 10 seconds while maintaining said stretch value;

(f) relaxing the conditioned product at a temperature between 100° and 120° C. over a period of time between 1 and 60 minutes.

7. Method of manufacturing polyvinyl chloride textile fibres comprising:

(a) dissolving in cyclohexanone a stabilizing amount of a stabilizing agent selected from the group consisting of:
(I) phenates of zinc, barium and cadmium;
(II) tin-organic compounds having structural formulae:

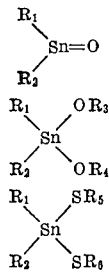

wherein $R_1$ and $R_2$ are selected among alkyl, aryl and aralkyl radicals, $R_3$ and $R_4$ are selected among alkyl and acyl radicals, $R_5$ and $R_6$ are selected among alkyl radicals;

(b) dissolving in the stabilizer-containing cyclohexanone at a temperature between 110° and 156° C.

a high-DS vinyl chloride polymer of a mean molecular weight between 50,000 and 120,000 to obtain a gel-free stabilized spinning dope comprising between 15% and 20% by weight of said polymer;

(c) wet-spinning the dope in the gel-free condition into a coagulating bath for said polymer comprising 15–50% cyclohexanone, 70–20% water and at least a sufficient quantity of a mutual solvent to insure miscibility thereof maintained at a temperature between 40° and 80° C. to obtain a filamentary product;

(d) said spinning bath consisting of a ternary solution comprising: 15–50% cyclohexanone, correspondingly 70–20% water, the balance consisting of a mutual solvent for cyclohexanone and water;

(e) stretching said filamentary product to a stretch value of at least 7 at a temperature between ambient temperature and 100° C.;

(f) finishing the stretched product in an aqueous finishing bath while maintaining said stretch value;

(g) drying the product at a temperature between 100° and 140° C. while still maintaining said stretch value;

(h) conditioning the dried product at a temperature between 180° and 220° C. over a period of time between 0.1 and 10 seconds while still maintaining the said stretch value;

(i) relaxing the conditioned product at a temperature between 100° and 120° C. over a period of time between 1 and 60 minutes.

8. The method of claim 2 wherein the coagulating bath is comprised of 15–50% cyclohexanone, 70–20% water, and at least a sufficient quantity of a mutual solvent therefor to insure miscibility thereof selected from the group consisting of methyl alcohol, ethyl alcohol, isopropyl alcohol, tertiary butyl alcohol, polyethylene glycol having a molecular weight in the range of between about 400 and 1500, acetone, acetic acid, phosphoric acid, hypophosphorous acid, nitric acid, and sulfuric acid.

9. The method of claim 3 wherein said mutual solvent for cyclohexanone and water in said coagulating bath is selected from the group consisting of methyl alcohol, ethyl alcohol, isopropyl alcohol, tertiary butyl alcohol, polyethylene glycol having a molecular weight in the range of about 400 to 1500, acetone, acetic acid, phosphoric acid, hypophosphorous acid, nitric acid, and sulfuric acid.

10. The method of claim 7 wherein said mutual solvent for cyclohexanone and water in said coagulating bath is selected from the group consisting of methyl alcohol, ethyl alcohol, isopropyl alcohol, tertiary butyl alcohol, polyethylene glycol having a molecular weight in the range of between about 400 and 1500, acetone, acetic acid, phosphoric acid, hypophosphorous acid, nitric acid, and sulfuric acid.

References Cited
UNITED STATES PATENTS

| | | | |
|---|---|---|---|
| 273,414 | 4/1943 | Hubert et al. | 18—54 |
| 362,460 | 4/1943 | Berg et al. | 18—54 |
| 2,190,265 | 2/1940 | Hubert et al. | 18—54 |
| 2,712,490 | 7/1955 | Stuchlik | 18—54 |
| 2,822,237 | 2/1958 | Iwame | 18—54 |
| 2,847,271 | 8/1958 | Siclari et al. | 18—54 |
| 3,236,825 | 2/1966 | Gord | 240—210 |
| 3,183,201 | 5/1965 | Shimeha et al. | 260—31.2 |
| 3,110,548 | 11/1963 | Fukushima et al. | 18—54 |

FOREIGN PATENTS

| | | |
|---|---|---|
| 1,198,455 | 6/1959 | France. |
| 853,726 | 11/1960 | Great Britain. |

JOSEPH L. SCHOFER, *Primary Examiner.*

MORRIS LIEBMAN, *Examiner.*

C. B. HAMBURG, J. A. DONAHUE,
*Assistant Examiners.*